United States Patent [19]

Madsen et al.

[11] Patent Number: 6,081,670
[45] Date of Patent: Jun. 27, 2000

[54] DEPTH-OF-FIELD INDICATOR FOR A CAMERA

[75] Inventors: Ricky J. Madsen, Crystal; Jon A. Holmes, Eden Prairie; Trygve D. Peterson, Savage, all of Minn.

[73] Assignee: Lifetouch National School Studies Inc., Eden Prairie, Minn.

[21] Appl. No.: 09/263,409

[22] Filed: Mar. 5, 1999

[51] Int. Cl.$^7$ .................................................. G03B 13/30
[52] U.S. Cl. .......................... 396/88; 396/147; 396/290; 396/292; 396/283
[58] Field of Search ............................ 396/88, 70, 147, 396/290, 374, 283, 292, 266, 503

[56] References Cited

U.S. PATENT DOCUMENTS

| | | |
|---|---|---|
| 4,223,987 | 9/1980 | Shimizu et al. ............... 396/283 X |
| 4,341,451 | 7/1982 | Krueger et al. ............... 396/290 X |
| 4,389,109 | 6/1983 | Taniguchi et al. ............ 396/283 X |
| 4,597,659 | 7/1986 | Suda et al. ................... 396/147 |
| 4,714,962 | 12/1987 | Levine . |
| 4,738,526 | 4/1988 | Larish . |
| 4,754,296 | 6/1988 | Neely ............................ 396/147 |
| 4,788,565 | 11/1988 | Masuda et al. . |
| 4,805,037 | 2/1989 | Noble et al. . |
| 4,827,303 | 5/1989 | Tsuboi .......................... 396/147 X |
| 4,841,359 | 6/1989 | Hawkins et al. . |
| 4,908,640 | 3/1990 | Masuda . |
| 4,920,371 | 4/1990 | Kaneko . |
| 4,949,117 | 8/1990 | Van Heyningen et al. . |
| 4,978,983 | 12/1990 | StÅlfors . |
| 5,006,871 | 4/1991 | Noble . |
| 5,055,863 | 10/1991 | Lindenfelser et al. . |
| 5,122,821 | 6/1992 | Nealon . |
| 5,150,215 | 9/1992 | Shi . |
| 5,162,829 | 11/1992 | Lynch et al. . |
| 5,307,168 | 4/1994 | Tashiro . |
| 5,329,325 | 7/1994 | McClellan et al. . |
| 5,361,119 | 11/1994 | Shida et al. ............................. 396/147 |
| 5,384,615 | 1/1995 | Hsieh et al. ............................. 396/147 |
| 5,389,984 | 2/1995 | Lovenheim ............................. 396/315 |
| 5,389,989 | 2/1995 | Hawkins et al. ....................... 348/64 X |
| 5,493,353 | 2/1996 | Chen ........................................ 348/64 |
| 5,546,121 | 8/1996 | Gotanda et al. ........................ 348/64 |
| 5,594,517 | 1/1997 | Tsunefuji ............................... 396/88 X |
| 5,619,257 | 4/1997 | Reele et al. ............................. 348/64 |
| 5,619,738 | 4/1997 | Petruchik et al. .................. 396/374 X |
| 5,664,243 | 9/1997 | Okada et al. ........................... 396/246 |
| 5,687,409 | 11/1997 | Miyamoto ............................. 396/290 |
| 5,687,412 | 11/1997 | McIntyre ............................... 396/319 |
| 5,749,006 | 5/1998 | McIntyre et al. ..................... 396/310 |
| 5,774,750 | 6/1998 | Honda .................................... 396/159 |
| 5,777,667 | 7/1998 | Miyake et al. ......................... 348/64 |
| 5,815,748 | 9/1998 | Hamamura et al. .................. 291/104 |
| 5,857,121 | 1/1999 | Arai et al. ......................... 396/374 X |

*Primary Examiner*—W. B. Perkey
*Attorney, Agent, or Firm*—Nikolai, Mersereau & Dietz, P.A.

[57] ABSTRACT

An apparatus for controlling a camera to achieve sharp, clear pictures includes a sensor for determining the distance of the camera from a subject and a controller for calculating the camera's depth-of-field, determining whether the subject is within the depth-of-field, and generating various signals which are provided to control operation of the camera or convey pertinent information to the photographer.

20 Claims, 7 Drawing Sheets

DEPTH-OF-FIELD INDICATOR FOR A CAMERA

FIELD OF THE INVENTION

The present invention relates to cameras. More particularly, the present invention relates to an apparatus for determining and displaying whether the object to be photographed is within the depth-of-field of the camera lens.

BACKGROUND OF THE INVENTION

In nearly all photography, the goal is to produce clear, sharp images of a subject. This is typically achieved by focusing the camera's lens. Thus, most lenses used on cameras incorporate some arrangement to allow for adjustment of the lens so subjects will be in focus over a range of distances. In recent years a variety of autofocus systems have been developed. These systems typically include a device for measuring the distance to the subject and using this measurement to actuate a motor or solenoid which adjusts the lens bringing the object into focus. Devices used to measure distance in such systems include ultrasonic, or infrared range finders. Alternatively, passive systems incorporating a moving mirror and a pair of photodiode arrays are commonly used. These systems adjust the focus distance until contrast is maximized without ever needing to know what the actual distance is.

Under most conditions, autofocus systems of the type described above work well when objects to be photographed are at rest. Passive systems are less effective when the subject is not well lighted. Ultrasonic systems are ineffective when photographing a subject through glass. Infrared systems can be fooled by unusual infrared reflectance from the subject. All such systems are less effective when photographing moving objects. There are delays in bringing the moving object into focus. Also, many autofocus systems disable the shutter. If the subject has moved, the desired image is lost before the shutter is enabled. This is particularly troublesome when photographing small, active children. All of these problems are exacerbated when the camera is equipped with a zoom lens. There is a real need to overcome the problems associated with autofocus, particularly if the camera is to be used in school photography where large numbers of active children must effectively and efficiently be photographed.

Given the problems associated with autofocus, school photographers have in the past typically used fixed focus cameras designed for portraiture. These cameras are generally limited to this function exclusively. Since the focus of the lens is not adjusted for each subject, either the subject or the camera must be moved to achieve proper focus. Manual measuring techniques are used to measure distance. For example, a string can be attached to the camera. The string has a marker indicating the proper focus distance. Checking of focus distance is accomplished by holding the string near the subject. This creates several potential problems. First, this method requires that the photographer reach near or even touch the subject. This invasion of the subject's personal space may make the subject very uncomfortable. Second, after the photographer measures the distance the photographer returns to the camera. Unbeknownst to the photographer, the subject may move out of focus after the measurement, but before the photograph is taken.

SUMMARY OF THE INVENTION

The present invention provides a camera system that overcomes most of the problems outlined above. This camera includes a zoom lens that is adjusted to provide clear, sharp photographs of the subject and does not rely on strings or other mechanical contrivances to ensure proper focus.

Rather than automatically adjusting focus, the camera system of the present invention solves the problems outlined above by calculating and displaying depth-of-field along with the subject distance. If the photographer attempts to take a picture when the subject distance is not within the depth-of-field, the camera system can either disable the acquisition of an image or inform the photographer that such an image has just been acquired. The system includes a distance measuring device such as an ultrasonic range finder or the like, a central processing unit (CPU), and a display. The CPU receives signals indicative of distance from the range finder and combines these signals with data related to the focus distance, focal length, F-stop settings of the lens, and circle of confusion to calculate the subject's position in relation to the depth-of-field. The CPU then displays this information in a graphical format. The CPU can also control the actuation of the shutter, issue other control signals to the camera system, or issue other visual or audible signals to the photographer based upon whether the subject is within the depth-of-field range of the camera.

A better understanding of the present invention and its advantages can be derived from a review of the following detailed description in light of the accompanying drawings.

DETAILED DESCRIPTION OF THE PREFERRED EMBODIMENTS

Every optical system includes an object, an element and an image. In a camera, the object is the subject to be photographed, the element is the combination of lenses and apertures, and the image is positioned where the light from the subject is focused by the lens. If this position is at the film plane or other image receptor, the picture will be "in focus". If, however, the image's position is behind or in front of the film plane, the picture will be out of focus.

As a general rule, when a subject is moved closer to the lens, the image moves farther from the lens. Conversely, as the subject moves farther from the lens, the image moves closer to the lens. Focus features typically are designed to adjust the lens system to cause the image to be in focus on the image plane. Some focus features are designed to move the image plane to the position of the image to cause the picture to be in focus.

The present invention takes a new approach to obtaining proper focus. Instead of trying to achieve a perfect match between the position of the image plane and the image, the present invention takes into account the limited resolving powers of the human eye viewing the image. Specifically, humans do not register out-of-focus situations so long as the subject is within the depth-of-field of the lens system.

Figure 1:
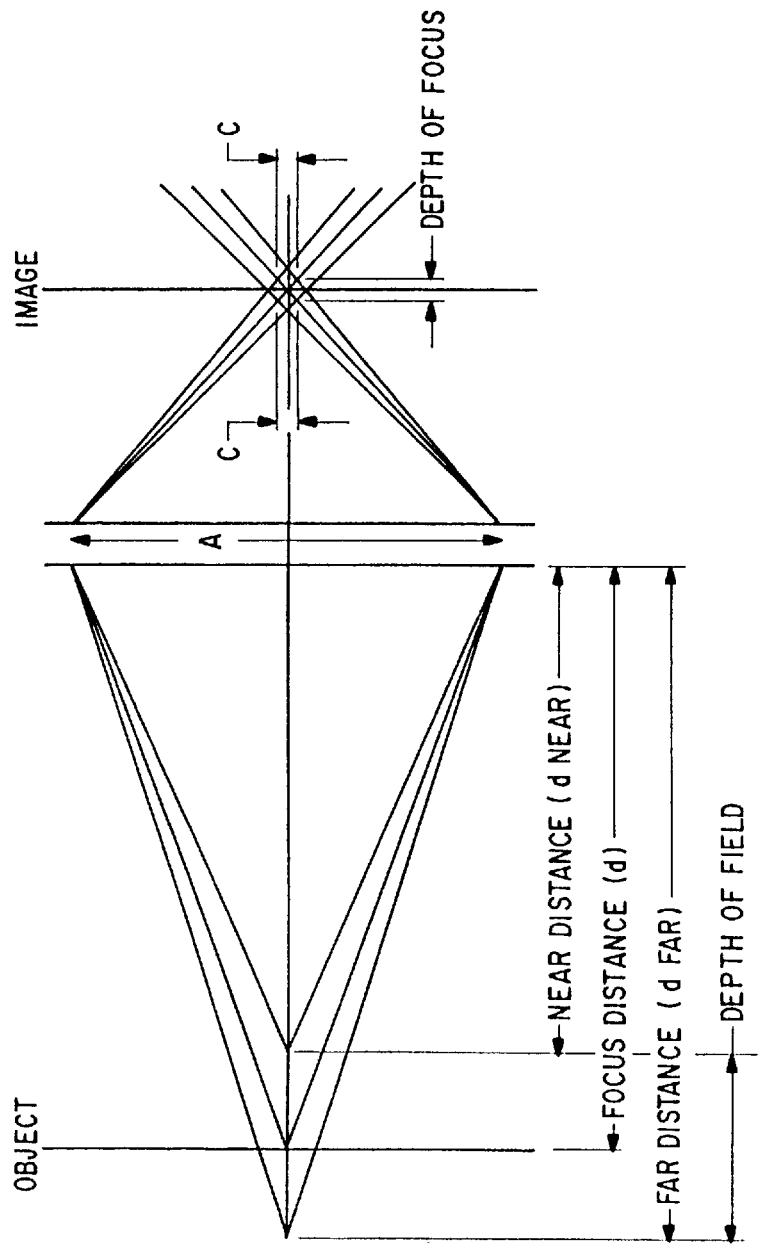
FIG. 1 is a diagram showing the parameters required for the mathematical determination of the depth-of-field of a lens.

FIG. 1 is a diagram demonstrating the concepts of depth-of-field and circle of confusion. As indicated above, the human eye cannot distinguish between a sharp image point and an out-of-focus point until the latter exceeds a critical value which is called the circle of confusion. The picture has higher resolution at the perfect focus distance but it is very difficult to distinguish with the unaided eye. Thus, there is a zone extending on either side of a subject plane which appears to be rendered equally sharp. This zone is known as the depth-of-field. In FIG. 1, the near and far limits of the depth-of-field are labeled dnear and dfar, respectively. Corresponding to the depth-of-field is the circle of confusion on the image plane formed by the lens focused on the subject at distance d. The diameter of the circle of confusion is c.

One can calculate the boundaries of the depth-of-field if certain information is known. This information includes the f-number of the lens N, the focal length of the lens (f), the focus distance of the lens (d), and the diameter of the circle of confusion (c). With this information ascertained, one can calculate the near limit dnear and far limit dfar of the depth-of-field using the following formulas:

$$dnear = d/(1+(dcN/f^2))$$

$$dfar = d/(1-(dcN/f^2))$$

In order to take advantage of the depth-of-field phenomena outlined above, it is advantageous to provide a system that can quickly and accurately calculate the near and far limits of depth-of-field as the parameters of the formula change. The present invention provides such a system.

Figure 2:
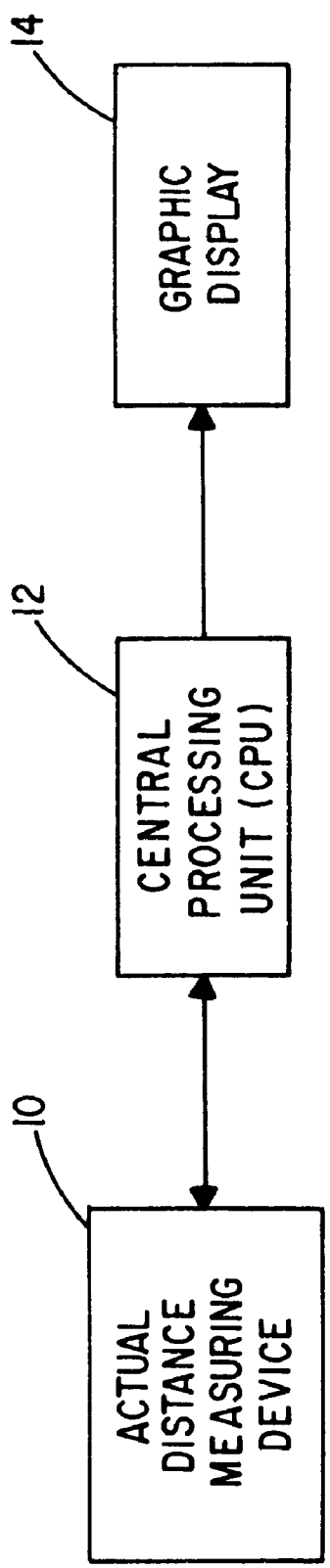
FIG. 2 is a block diagram of the hardware used in a preferred embodiment of the present invention.

A simple form of the invention is block diagramed in FIG. 2. As shown, the invention includes a measuring device 10, a controller 12 comprising a CPU and a display 14. The measuring device 10 of the preferred embodiment is an ultrasonic range finder. Other types of range finders capable of generating a signal indicative of distance to the subject could also be used. Suitable infrared and laser range finders could, for example, be used.

In addition to the signals received from the measuring device 10, the controller 12 must also receive for processing data related to the focus distance, focal length and F-stop of the lens. This data can be preprogrammed. Alternatively, sensors could be provided to check these parameters and provide the required data to the controller 12. A sensor to detect and transmit focal length will be preferred, for example, if a zoom lens rather than a fixed focal length lens is used. The controller processes this data in accordance with a preprogrammed set of instructions to generate control signals and provide information to the display 14.

The display 14 provides user friendly indicia based upon signals sent by the controller. These indicia allow the photographer to easily ascertain the current status of the camera and its ability to capture a clear image. The display, at a minimum, should tell the photographer whether the subject to be photographed is within the depth-of-field. The display 14 can be of varying designs. A VGA display is ideal for cameras used in school photography. However, any other display, including but not limited to LCD or LED displays, could be used without deviating from the invention.

Figure 3:
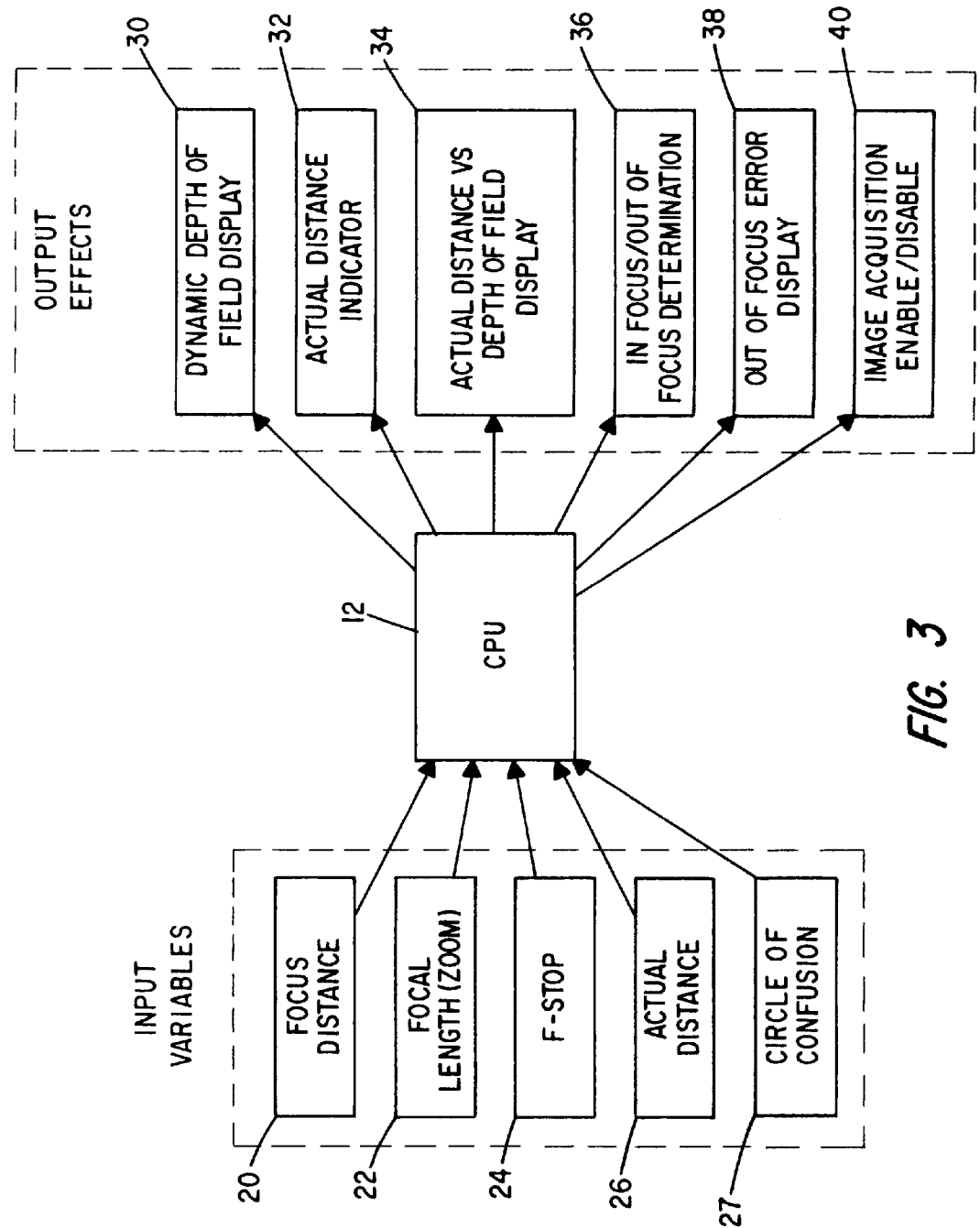
FIG. 3 is a block diagram showing the data inputs and outputs from the controller of a preferred embodiment of the present invention.

FIG. 3 shows the key inputs provided to the controller 12 on the left-hand side. These include the focus distance 20, the focal length 22, the F-stop 24, the diameter of the circle of confusion 27 and the actual distance to the subject 26. Again, the distance 26 is provided by the measuring device 10. The other data can be (a) provided by sensors; (b) programming them into the controller by the photographer as part of an initialization step; or (c) preprogrammed at the factory.

Various outputs can be generated by the controller based upon these inputs. Some of these are shown on the right side of FIG. 3. The display 14 can show a dynamic depth-of-field display that changes in response to the inputs. For example, as the changes in the focal length are detected by the measuring device 22, the changes in the size of the depth-of-field are reflected on the display. In FIG. 3 this is referred to as Dynamic Depth-of-field Display 30. Changes in actual distance 20 as detected by the measuring device 10 can also be displayed. This is shown as Actual Distance Indicator 32. The Actual Distance vs. Depth-of-field Display 34 could be a graphical representation incorporating the Dynamic Depth-of-Field Display 30 and the Actual Distance Indicator 32. Display 34, thus, can provide a graphical indication of whether the actual distance is inside or outside the depth-of-field.

The CPU of controller 12 is able to perform various logic operations and generate control signals based upon these logic operations. One such logic operation is In Focus/Out of Focus Determination 36. Based upon this logic operation, the controller can generate error messages such as Out of Focus Error Display 38 or a control signal such as Image Acquisition Enable/Disable Control Signal 40. Other control signals could also be generated to audible warning devices or other subsystems of the camera.

Figure 4:
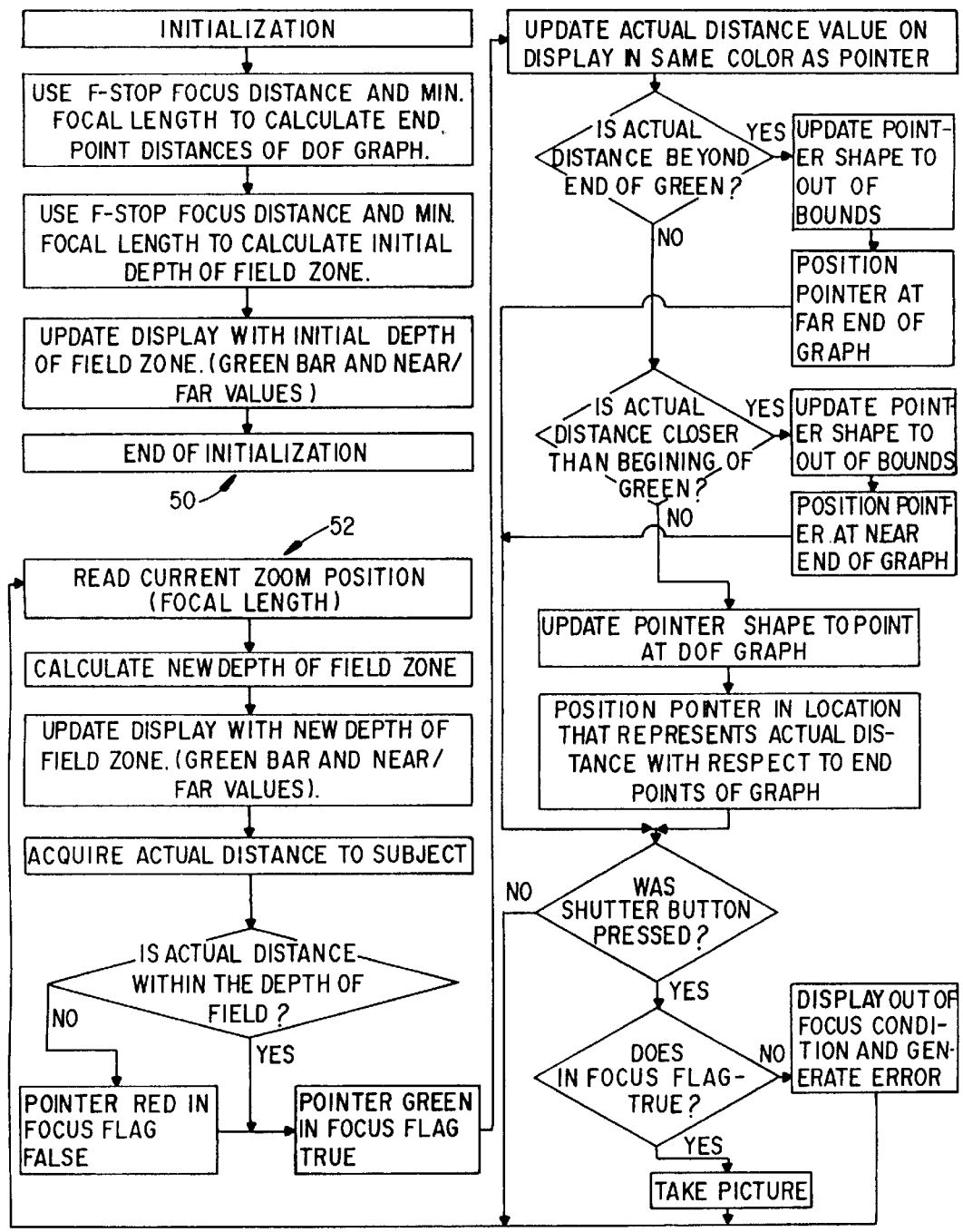
FIG. 4 is a flow chart showing the manner in which the controller of the preferred embodiment operates.

FIG. 4 is a flow chart intended to show the manner in which the controller processes information and provides output signals. The flow chart shows an initialization phase 50 and a continuous loop phase 52. The initialization phase 50 is used to establish a graphical representation of depth-of-field on the display 14. The data used as part of this initialization phase includes Focus Distance 20, Focal Length 22, F-stop 24 and the diameter of the circle of confusion 27. When a color display is used, the output is an initial depth-of-field zone incorporating a green bar representative of the depth-of-field with red above and below to represent out of focus. The near and far values of the depth-of-field are also numerically displayed. See, for example, FIGS. 5–7.

Once the initialization phase 50 is complete, the system automatically enters the continuous loop phase 52. When a zoom lens is used, the first step of phase 52 is to read the current focal length, calculate a new depth-of-field and update the depth-of-field display. The second step is to acquire actual distance from the measuring device 10. Once this data has been obtained, certain logic operations take place. The first logic operation involves determining whether the actual distance to the subject is within the depth-of-field. Based upon this logic operation, the display is updated to provide an indicator to the photographer.

The flow chart of FIG. 4 also shows that the present invention incorporates logic enabling the photographer to determine from the display whether the subject is within the depth-of-field, too far or too close. The logic of the system also is responsive to actuation of the image acquisition button. As shown in FIG. 4, upon actuation of the image acquisition button, the present invention will only permit the acquisition of an image if the subject is within the depth-of-field. If not, image acquisition is disabled and an error message is generated.

Figure 5:
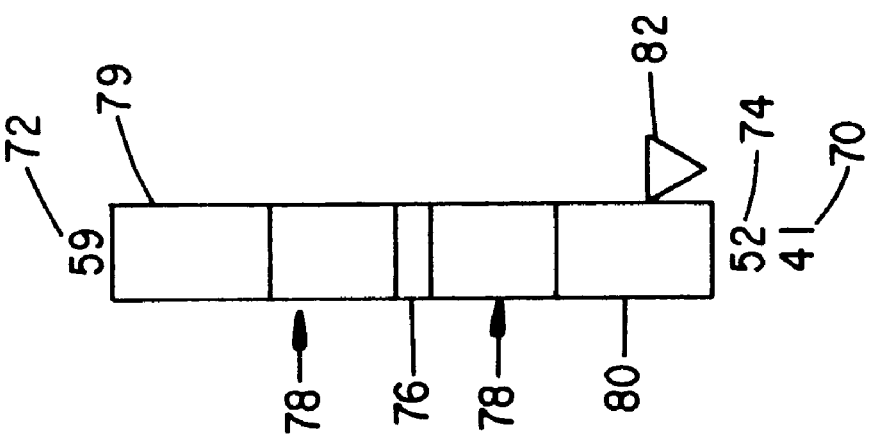
FIG. 5 is a diagram showing an example of a display generated by the controller when the camera is in focus.
Figure 6:
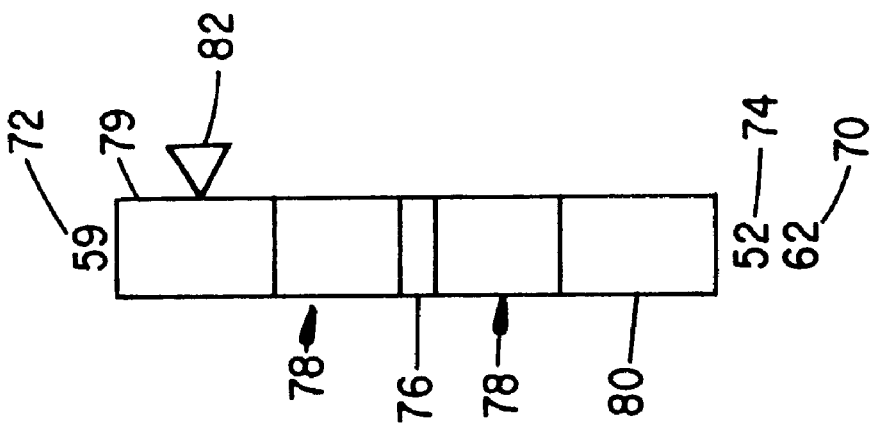
FIG. 6 is a diagram showing an example of a display generated by the controller when the camera is out of focus because the actual distance between the camera and the subject is outside of the depth-of-field of the lens.
Figure 7:
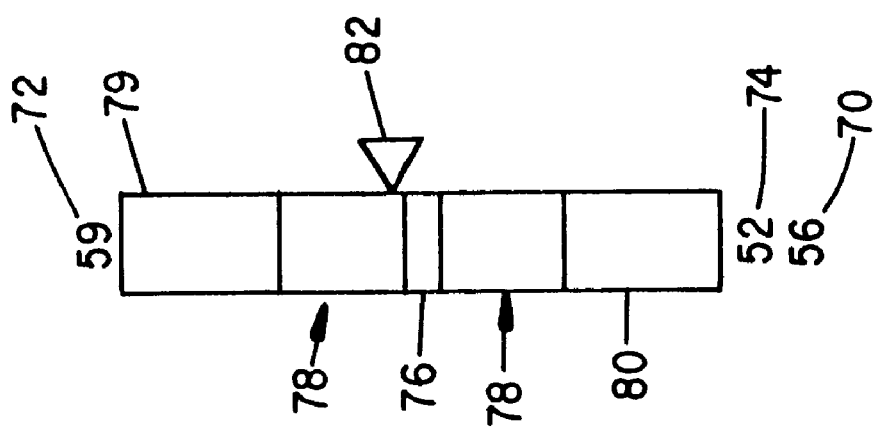
FIG. 7 is a diagram showing an example of a display generated by the controller when the camera is out of focus because the actual distance between the camera and the subject is too close to be within the depth-of-field zone.

FIGS. 5–7 are examples of information that can be displayed. In each of these figures, the display includes numerical representations of the actual distance 70, the depth-of-field (far depth-of-field limit 72 and the near depth-of-field limit 74). The display also includes a bar graph comprising a section 76 indicating focus distance, and a section 78 indicating the depth-of-field. Outside the depth-of-field section 78 are a too far section 79 and a too near section 80. Finally, the graph includes a pointer 82 which indicates with respect to the bar graph the actual distance to the subject. The sizes of the depth-of-field section 78 and the too far and too near sections 79 and 80 will change to reflect changes in depth-of-field. Likewise, the pointer moves to reflect how the actual distance relates to depth-of-field.

FIG. 5 is an example of the actual distance being within the depth-of-field. In this example, the arrow 82 is green and points to a section 78 which is also green, signifying that the subject is within the depth-of-field and a picture can be taken. Also, the actual distance number 70 is displayed in green. The too far and too near sections 79 and 80 are in a contrasting color such as red.

FIG. 6 provides an example of what might be displayed when the subject is too far from the camera to be within the depth-of-field. The arrow 82 now points to the too far section 79 and has changed color from green to red. Also, the actual distance number has changed to red.

FIG. 7 provides an example of what might be displayed if the subject is so close to the camera that it is neither within the depth-of-field or even the distance represented by the too near section 80. The arrow 82 has changed so it now points downwardly and the actual distance 70 is again shown in red because the camera is too close to the subject to fall within the depth-of-field.

Figure 8:
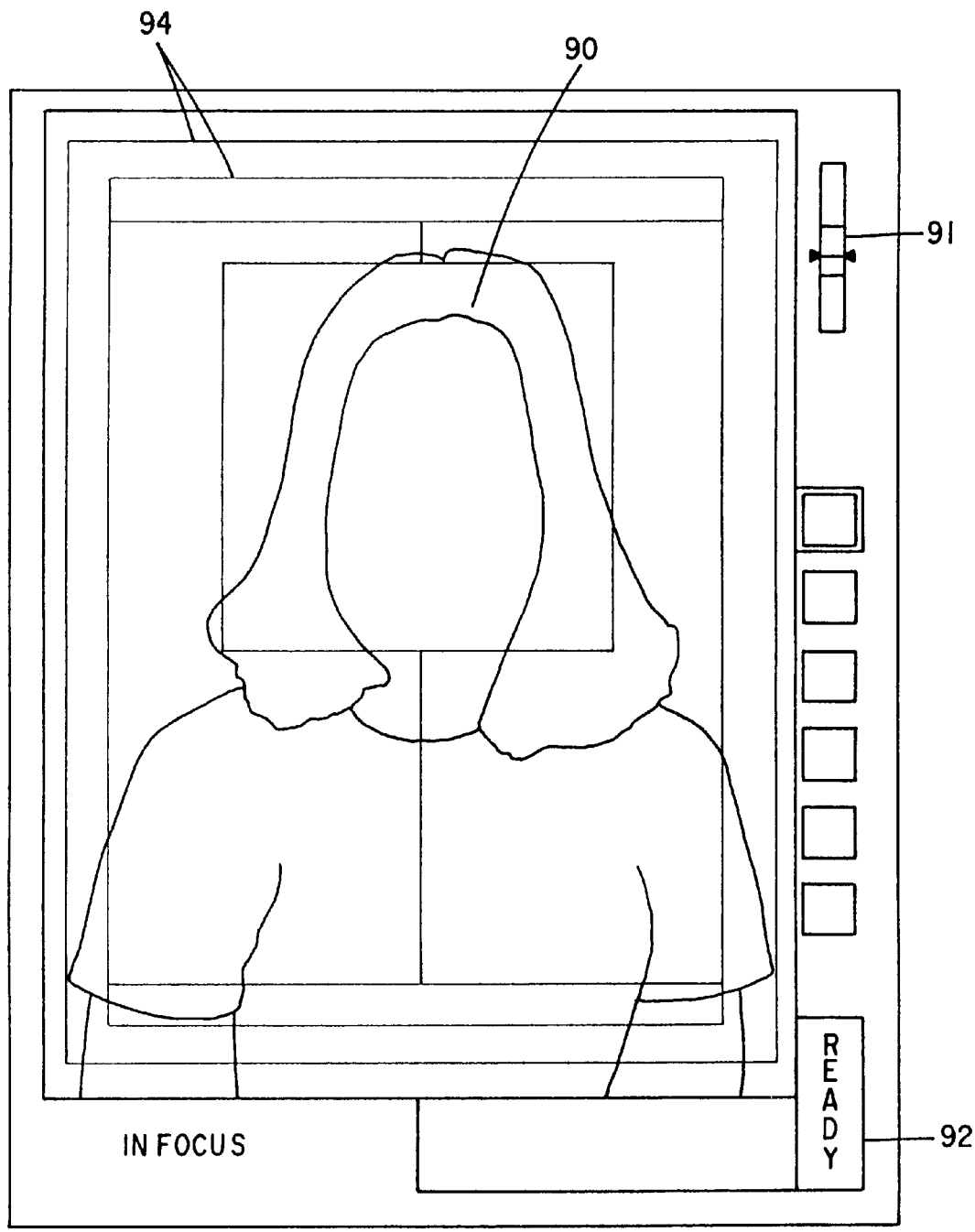
FIG. 8 shows an example of what a photographer sees in the viewfinder when the subject is within the depth-of-field.
Figure 9:
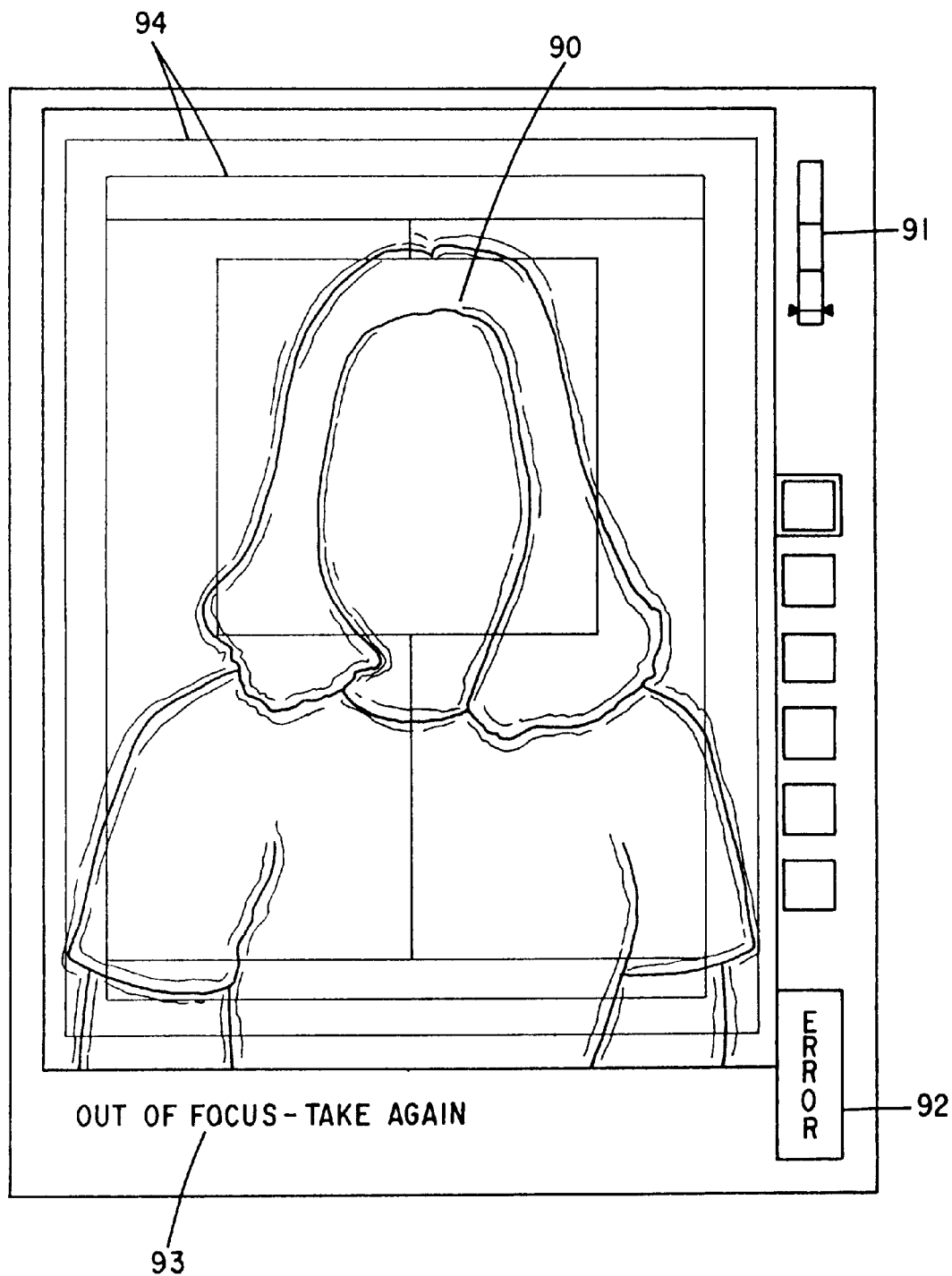
FIG. 9 shows an example of what a photographer sees in the viewfinder after attempting to take a picture with the subject outside the depth-of-field.

FIGS. 8 and 9 show more complex displays with a monitor actually serving as the viewfinder for the camera. The image 90 of the subject to be photographed is shown in the viewfinder. A bar graph 91 is also shown. The bar graph 91 operates as discussed with respect to FIGS. 5–7. The display shown in FIGS. 8 and 9 also include a colored error section 92. In FIG. 8, this error section shows "Ready". In FIG. 9, this error section shows "Error". FIG. 9 also shows a field 93 describing the nature of the error. Finally, the display includes a number of positioning lines 94 that can be used to properly frame the subject to be photographed. While not shown, the color of the lines can change to reflect an error condition. More simple displays could also be used. The display need not even be a color display. A gray scale display could effectively be used, for example, without deviating from the invention.

The foregoing discussion is not intended to be limiting. Instead, it is intended to comply with the disclosure requirements of the patent laws. As indicated above, a number of changes and modifications can be made without deviating from the scope of the invention. The scope of invention is only limited by the following claims which are to be interpreted to include a full range of equivalents.

What is claimed:

1. A camera system including:
   a. a zoom lens;
   b. a zoom lens position detecting device;
   c. a image acquisition device;
   d. a display;
   e. a distance measuring device;
   f. a CPU operating under software control and in a continuous loop for controlling the operation of said image acquisition device and sending signals to said display based upon determinations made by the controller with each iteration of said continuous loop of the depth-of-field of the camera system and the distance of a subject to be photographed from the camera system, said determinations of the depth-of-field based upon inputs received by the CPU indicative of focus distance, focal length, circle of confusion and F-stop and said determination of distance of a subject to be photographed from the camera system based upon inputs received from said distance measuring device.

2. The camera system of claim 1 wherein said distance measuring device uses sound to determine distance.

3. The camera system of claim 1 wherein said distance measuring device uses light to determine distance.

4. A camera system including:
   (a) a zoom lens;
   (b) a first sensor for determining the position of the zoom lens;
   (c) a second sensor for determining the distance between the camera system and the subject to be photographed;
   (d) for controlling operation of the camera system, a controller that
      (i) receives information representative of the position of the zoom lens from said first sensor and representative of said distance between the camera system and the subject to be photographed from said second sensor;
      (ii) processes said information in a continuous loop and in accordance with a predetermined set of instructions to make a determination with each iteration of said continuous loop of whether the subject to be photographed is within the depth-of-field of said camera system;
      (iii) generates output signals based upon said determination made in the most recent iteration of said loop; and
   (e) a display wherein certain said output signals are sent to the display so that the display indicates whether the subject to be photographed is within the depth-of-field of the camera system.

5. The camera system of claim 4 further including an audible alarm and wherein at least one of said output signals is sent to an audible alarm to indicate whether the subject to be photographed is within the depth-of-field of the camera system.

6. The camera system of claim 4 further including an image acquisition device and wherein at least one of said output signals is used to control the operation of said device.

7. The camera system of claim 4 further including means for adjusting F-stop, then using the F-stop setting by the controller to determine the depth-of-field of the camera system.

8. The camera system of claim 4 wherein said display is a graphical display.

9. The camera system of claim 8 wherein said display is a color display.

10. The camera system of claim 8 wherein said display is a grey scale display.

11. The camera system of claim 8 wherein said display is an LED display.

12. The camera system of claim 8 wherein said display is an LCD display.

13. The camera system of claim 8 wherein said display is a video display.

14. The camera system of claim 8 wherein said display is a video display that also serves as a view finder for said camera.

15. The camera system of claim 8 wherein said display indicates whether the subject to be photographed is within the depth-of-field of the camera system by showing a bar graph indicative of the size of the depth-of-field and a pointer indicating the distance of the subject from the camera relative to the depth-of-field.

16. The camera system of claim 8 wherein at least one object appearing on the display is a first color when the subject to be photographed is inside the depth-of-field of the camera and is a different color when the subject to be photographed is outside the depth-of-field.

17. The camera system of claim 8 wherein at least one object appearing on the display is a first shape when the subject to be photographed is inside the depth-of-field of the camera and is a different shape when the subject to be photographed is outside the depth-of-field.

18. The camera system of claim 4 wherein at least one light or indicator turns on or off or begins blinking in response to the subject being outside of the depth-of-field.

19. The camera system of claim 4 wherein the inner boundary and outer boundary of the depth-of-field and the distance from the camera system to the subject are numerically displayed.

20. The camera system of claim 4 wherein said display is a color display which also serves as a view finder for the camera system, said display capable of displaying the image to be photographed, at least one positioning mark used in posing the subject to be photographed, a color bar graph indicative of the depth-of-field of the camera system, a marker cooperating with the bar graph to indicate the distance of the subject to the camera relative to depth-of-field, and a numerical representation of the inner and outer boundaries of the depth-of-field and the distance of a subject from the camera system.

\* \* \* \* \*